(12) United States Patent
Dikan et al.

(10) Patent No.: US 9,388,300 B2
(45) Date of Patent: *Jul. 12, 2016

(54) HIGH STRUCTURE CARBON BLACKS

(71) Applicant: Cabot Corporation, Boston, MA (US)

(72) Inventors: Andrew P. Dikan, Boston, MA (US); Stephane F. Rouanet, Westford, MA (US); Heather E. Clarke, Lancaster, MA (US); Bruce E. MacKay, Framingham, MA (US); Danny Pierre, Malden, MA (US)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/723,526

(22) Filed: May 28, 2015

(65) Prior Publication Data

US 2015/0259513 A1   Sep. 17, 2015

Related U.S. Application Data

(62) Division of application No. 13/940,945, filed on Jul. 12, 2013, now Pat. No. 9,056,994.

(60) Provisional application No. 61/781,618, filed on Mar. 14, 2013, provisional application No. 61/671,359, filed on Jul. 13, 2012.

(51) Int. Cl.
*C09D 11/30* (2014.01)
*C08K 9/04* (2006.01)
(Continued)

(52) U.S. Cl.
CPC .............. *C08K 9/04* (2013.01); *B01J 19/1881* (2013.01); *B01J 19/26* (2013.01); *C08K 3/04* (2013.01); *C08K 5/175* (2013.01); *C08K 5/5317* (2013.01); *C09C 1/48* (2013.01); *C09C 1/50* (2013.01); *C09C 1/565* (2013.01); *C09D 11/324* (2013.01); *B01J 2219/00177* (2013.01); *C01P 2004/51* (2013.01); *C01P 2004/62* (2013.01); *C01P 2006/12* (2013.01); *C01P 2006/19* (2013.01);
(Continued)

(58) Field of Classification Search
CPC .............................. C08K 13/06; C09D 11/324
See application file for complete search history.

(56) References Cited

U.S. PATENT DOCUMENTS 5,085,698 A   2/1992   Ma et al.
5,538,548 A   7/1996   Yamazaki
(Continued)

FOREIGN PATENT DOCUMENTS

CA   2351162   12/2001
EP   1394221 A1   3/2004
(Continued)

OTHER PUBLICATIONS

Tsubokawa, N., Functionalization of Carbon Black by Surface Grafting of Polymers, Prog. Polym. Sci., vol. 17, 1992, 417-470.
(Continued)

*Primary Examiner* — Veronica F Faison

(57) ABSTRACT

Disclosed herein are high structured carbon blacks, methods of synthesis and treatment, and dispersions and inkjet ink formulations prepared therefrom. The carbon black can have the following properties: OAN ≥170 mL/100 g; and STSA ranging from 160 to 220 m²/g. The carbon black can also have the following properties: OAN ≥170 mL/100 g; and a ratio of STSA/BET surface area ranging from 0.7 to 1.

45 Claims, 2 Drawing Sheets

Figure 1:
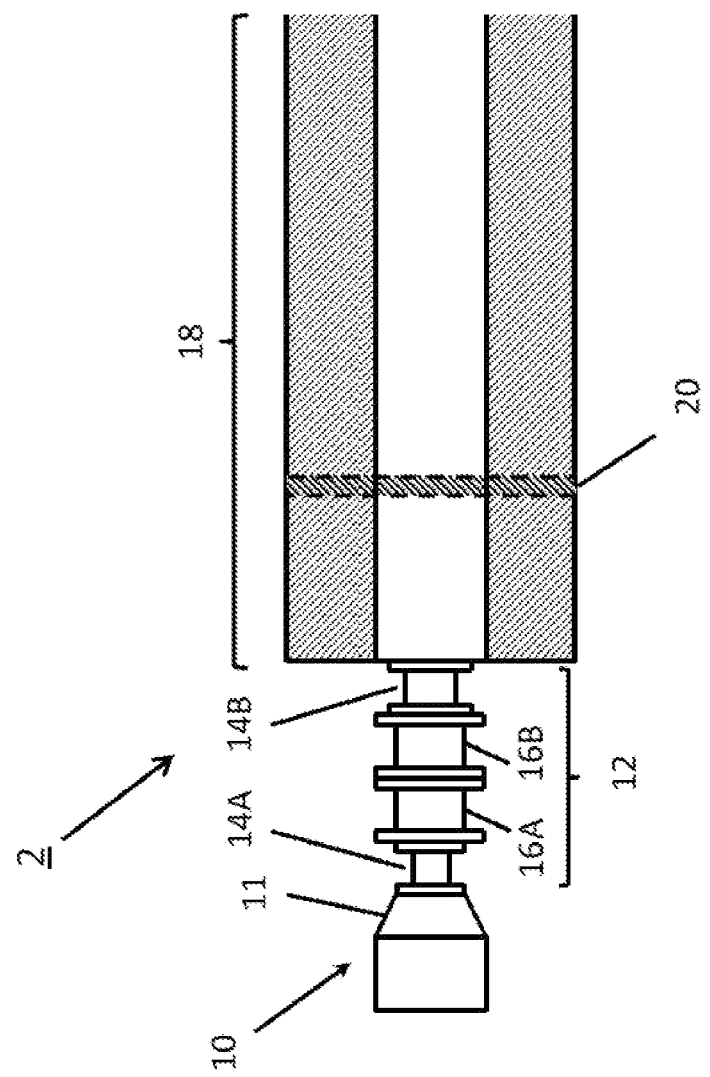

(51) Int. Cl.
*C08K 3/04* (2006.01)
*C08K 5/17* (2006.01)
*C08K 5/5317* (2006.01)
*C09D 11/324* (2014.01)
*B01J 19/18* (2006.01)
*B01J 19/26* (2006.01)
*C09C 1/48* (2006.01)
*C09C 1/50* (2006.01)
*C09C 1/56* (2006.01)

(52) U.S. Cl.
CPC ......... *C01P 2006/22* (2013.01); *C01P 2006/40* (2013.01); *Y10T 428/2982* (2015.01)

(56) References Cited

U.S. PATENT DOCUMENTS

| | | | |
|---|---|---|---|
| 5,554,739 A | 9/1996 | Belmont | |
| 5,571,311 A | 11/1996 | Belmont et al. | |
| 5,630,868 A | 5/1997 | Belmont et al. | |
| 5,672,198 A | 9/1997 | Belmont | |
| 5,707,432 A | 1/1998 | Adams et al. | |
| 5,713,988 A | 2/1998 | Belmont et al. | |
| 5,803,959 A | 9/1998 | Johnson et al. | |
| 5,837,045 A | 11/1998 | Johnson et al. | |
| 5,851,280 A | 12/1998 | Belmont et al. | |
| 5,885,335 A | 3/1999 | Adams et al. | |
| 5,895,522 A | 4/1999 | Belmont et al. | |
| 5,900,029 A | 5/1999 | Belmont et al. | |
| 5,919,294 A | 7/1999 | Hirasa et al. | |
| 5,922,118 A | 7/1999 | Johnson et al. | |
| 5,955,232 A | 9/1999 | Little et al. | |
| 5,998,501 A | 12/1999 | Tsutsumi et al. | |
| 6,042,643 A | 3/2000 | Belmont et al. | |
| 6,068,688 A | 5/2000 | Whitehouse et al. | |
| 6,074,467 A | 6/2000 | Tabayashi et al. | |
| 6,103,380 A | 8/2000 | Devonport | |
| 6,110,994 A | 8/2000 | Cooke et al. | |
| 6,123,759 A * | 9/2000 | Mise ................ C09C 1/565 106/31.9 |
| 6,336,965 B1 | 1/2002 | Johnson et al. | |
| 6,337,358 B1 | 1/2002 | Whitehouse et al. | |
| 6,340,724 B1 * | 1/2002 | Gorl .................. C08J 3/212 523/200 |
| 6,350,519 B1 | 2/2002 | Devonport | |
| 6,368,239 B1 | 4/2002 | Devonport et al. | |
| 6,372,820 B1 | 4/2002 | Devonport | |
| 6,398,858 B1 | 6/2002 | Yu et al. | |
| 6,432,194 B2 | 8/2002 | Johnson et al. | |
| 6,471,763 B1 | 10/2002 | Karl | |
| 6,472,471 B2 | 10/2002 | Cooke et al. | |
| 6,478,863 B2 | 11/2002 | Johnson et al. | |
| 6,494,943 B1 | 12/2002 | Yu et al. | |
| 6,534,569 B2 | 3/2003 | Mahmud et al. | |
| 6,551,393 B2 | 4/2003 | Devonport et al. | |
| 6,627,693 B1 | 9/2003 | Laube et al. | |
| 6,641,656 B2 | 11/2003 | Yu et al. | |
| 6,660,075 B2 | 12/2003 | Bergemann et al. | |
| 6,664,312 B2 | 12/2003 | Devonport | |
| 6,699,319 B2 | 3/2004 | Adams et al. | |
| 6,723,783 B2 | 4/2004 | Palumbo et al. | |
| 6,831,194 B2 * | 12/2004 | Srinivas ............ C09D 11/324 106/472 |
| 6,852,158 B2 | 2/2005 | Belmont et al. | |
| 6,852,777 B1 | 2/2005 | Nakano et al. | |
| 6,911,073 B2 | 6/2005 | Adams et al. | |
| 6,916,367 B2 | 7/2005 | Palumbo | |
| 6,929,889 B2 | 8/2005 | Belmont | |
| 6,936,097 B2 | 8/2005 | Shakhnovich | |
| 6,942,724 B2 | 9/2005 | Yu | |
| 7,056,962 B2 | 6/2006 | Johnson et al. | |
| 7,074,843 B2 | 7/2006 | Nakamura et al. | |
| 7,173,078 B2 | 2/2007 | Lamprey et al. | |
| 7,214,263 B2 | 5/2007 | Kakiuchi et al. | |
| 7,220,304 B2 | 5/2007 | Momose et al. | |
| 7,232,480 B2 | 6/2007 | Momose et al. | |
| 7,485,280 B2 | 2/2009 | Matsuki et al. | |
| 7,829,057 B2 | 11/2010 | Kutsovsky et al. | |
| 7,847,009 B2 | 12/2010 | Wong et al. | |
| 2001/0036994 A1 | 11/2001 | Bergemann et al. | |
| 2003/0101901 A1 | 6/2003 | Bergemann et al. | |
| 2004/0171725 A1 | 9/2004 | Richardson et al. | |
| 2005/0100502 A1 | 5/2005 | Krauss et al. | |
| 2006/0189717 A1 | 8/2006 | Johnson et al. | |
| 2007/0100024 A1 | 5/2007 | Gu et al. | |
| 2007/0104636 A1 | 5/2007 | Kutsovsky et al. | |
| 2008/0177003 A1 | 7/2008 | Lee et al. | |
| 2010/0269732 A1 * | 10/2010 | Sekiyama ............ C09D 11/324 106/31.9 |
| 2012/0092598 A1 * | 4/2012 | Kyrlidis ................ B82Y 30/00 349/106 |
| 2014/0162064 A1 * | 6/2014 | Dikan ...................... C08K 3/04 428/402 |

FOREIGN PATENT DOCUMENTS

| | | |
|---|---|---|
| EP | 1479732 A1 | 11/2004 |
| EP | 2348068 A1 | 7/2011 |
| WO | WO 96/18688 | 6/1996 |
| WO | WO 96/18690 | 6/1996 |
| WO | WO 99/23174 | 5/1999 |
| WO | WO 00/34370 A1 | 6/2000 |
| WO | WO 01/51566 A1 | 7/2001 |
| WO | WO 2004/063289 A2 | 7/2004 |
| WO | WO 2004/111140 A1 | 12/2004 |
| WO | WO 2005/061087 A1 | 7/2005 |
| WO | WO 2006/064193 | 6/2006 |
| WO | WO 2006/086599 A1 | 8/2006 |
| WO | WO 2006/086660 A1 | 8/2006 |
| WO | WO 2007/053563 A2 | 5/2007 |
| WO | WO 2007/053564 A2 | 5/2007 |
| WO | WO 2008/091653 A2 | 7/2008 |
| WO | WO 2009/048564 A2 | 4/2009 |
| WO | WO 2010/141071 A1 | 12/2010 |
| WO | WO 2011/143533 A2 | 11/2011 |

OTHER PUBLICATIONS

Tsubokawa, N., Grafting onto Carbon Black: Reaction of Urethane Prepolymer with Carbon Black Surface, J. Polym. Sci. Polym. Chem. Ed. vol. 20, 1982, 1943-1946.

Tsubokawa, N. et al., Grafting Reaction of Surface Carboxyl Groups on Carbon Black with Polymers Having Terminal Hydroxyl or Amino Groups Using $N,N^1$-dicyclohexylcarbodiimide as a Condensing Agent, Reactive & Functional Polymers, 27, 1995, 75-81.

PCT Patent Application No. PCT/US2013/39381, filed at the USPTO on May 3, 2013.

International Search Report and the Written Opinion of the International Searching Authority, or the Declaration for International Application No. PCT/US2013/050295, mailed on Jan. 22, 2014.

Standard Test Method for Carbon Black: Total and External Surface Area by Nitrogen Adsorptionl, ASTM International Designation: D6556-10 [online], Jan. 31, 2012, pp. 1-5, XP002716076, Retrieved from the Internet: http://www.biochar-international.org/sites/default/files/ASTM%20D6556-10%20N2%20BET%20for%20Carbon%20Black%20.juhu2739.pdf.

* cited by examiner

HIGH STRUCTURE CARBON BLACKS

CROSS REFERENCE TO RELATED APPLICATIONS

This application is a divisional of U.S. application Ser. No. 13/940,945, filed on Jul. 12, 2013, which claims the benefit of U.S. Provisional Patent Application Nos. 61/671,359, filed on Jul. 13, 2012, and 61/781,618, filed on Mar. 14, 2013, the disclosures of which are incorporated herein by reference.

FIELD OF THE INVENTION

Disclosed herein are high structure carbon blacks, methods of preparation, and surface treatment thereof. Also disclosed are dispersions and inkjet ink compositions comprising such blacks.

BACKGROUND

There is a continual need for new carbon black materials to enhance performance in a number of applications. For example, in inkjet ink printing, manufacturers seek improved optical density of the printed product, particularly as new paper types and printers are developed.

SUMMARY

One embodiment provides a carbon black having the following properties:
 OAN ≥170 mL/100 g; and
 STSA ranging from 160 to 220 $m^2/g$.
Another embodiment provides a carbon black having the following properties:
 OAN ≥170 mL/100 g; and
 a ratio of STSA/BET ranging from 0.7 to 1.
Another embodiment provides a carbon black having the following properties:
 OAN ≥170 mL/100 g;
 STSA ranging from 160 to 220 $m^2/g$; and
 BET surface area ranging from 190 to 275 $m^2/g$.
Another embodiment provides a carbon black having the following properties:
 OAN ≥170 mL/100 g;
 BET surface area≥150 $m^2/g$; and
 COAN of at least 130 mL/100 g.
Another embodiment provides a method of oxidizing a pigment, comprising adding ozone to an aqueous dispersion comprising the pigment while maintaining the aqueous dispersion at a pH of at least 8.5.

Another embodiment provides an ozone reactor assembly for oxidizing a pigment having a circulated pathway, comprising:
 a reservoir for containing and agitating a dispersion comprising a pigment, the aqueous dispersion being in fluid communication with a pH probe and a first pump for delivering a base to the dispersion;
 a second pump in fluid communication with the reservoir for withdrawing and delivering the aqueous dispersion through a first hosing to a venturi tube, wherein the aqueous dispersion passes through a constricted region of the venturi tube;
 a source of ozone in gaseous communication with the venturi tube via an inlet at or upstream the constricted region, wherein the ozone contacts the pigment while passing through the constricted region; and
 a second hosing for carrying a mixture comprising ozone and the aqueous dispersion to the reservoir.

BRIEF DESCRIPTION OF THE DRAWING(S)

Figure 2:
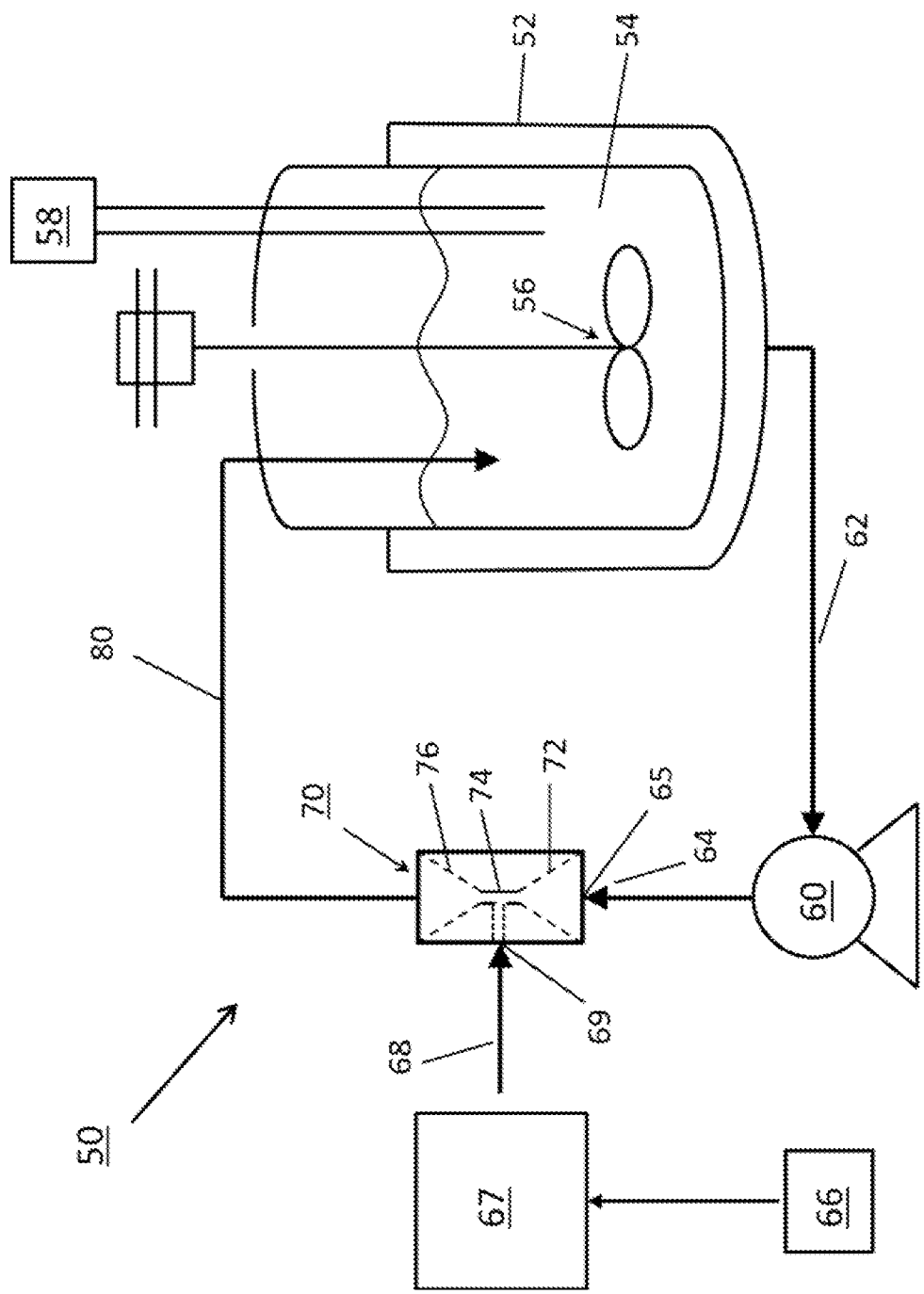

FIG. 1 is a cross-sectional schematic of a front end of a dual-stage carbon black reactor; and
FIG. 2 is a schematic of an ozone reactor assembly.

DETAILED DESCRIPTION

Disclosed herein are high structure carbon blacks.
In one embodiment, the carbon blacks are channel blacks, furnace blacks and lamp blacks. In one embodiment, the carbon blacks disclosed herein are furnace blacks. In one embodiment, the reactor for preparing furnace carbon blacks black is a multi-stage reactor, such as those described in U.S. Pat. No. 7,829,057 or U.S. Pub. No. 2007/0104636, the disclosures of which are incorporated herein by reference. As used herein, a "multi-stage reactor" is outfitted with two or more feedstock injection locations, with subsequent injection locations(s) being positioned downstream a first injection location.

FIG. 1 is a cross-sectional schematic of the front end of a carbon black reactor 2. Reactor 2 includes a combustion chamber 10 in which a combustion gas (liquid or gaseous fuel) is mixed with an oxidant (comprising, e.g., oxygen, air) and ignited by any method known in the art. The ignited gas flows through a frustoconical transition zone 11 to converge the diameter to a generally tunnel-like zone 12 comprising a number of tubular sections. Feedstock injection ports are positioned within front and end tubular sections 14A and 14B of zone 12, where end section 14B is positioned downstream section 14A. Typically, more than one injection inlet port is arranged circumferentially per each section 14A and 14B. Between front and end sections 14A and 14B are one or more spacer transition tubings—FIG. 1 illustrates two spacer tubing sections 16A and 16B, although one spacer tubing, or three or more spacer tubings can be used depending on the desired carbon black property.

In the configuration of FIG. 1, fuel is ignited at combustion chamber 10 and the resulting flow is directed to tunnel-like zone 12 where the fuel contacts a first injection of feedstock injection at front tubing section 14A. Subsequent flow through spacer tubings 16A and 16B allows the formation of seed carbon black particles, which then contact a second charge of feedstock introduced at tubing section 14B. The gas/carbon black particle mixture is then quenched at refractory 18. The quenching is typically performed by a water spray at a quench location 20, of which the distance from zone 12 can be varied. This configuration, such as the number of spacer tubings and dimensions, allows the production of high structure, highly branched carbon black particles via smaller seed or precursor carbon black particles.

One embodiment provides a carbon black having the following properties:
 OAN ≥170 mL/100 g; and
 STSA ranging from 160 to 220 $m^2/g$.
Another embodiment provides a carbon black having the following properties:
 OAN ≥170 mL/100 g; and
 a ratio of STSA/BET ranging from 0.7 to 1.
In one embodiment, the carbon blacks are useful as pigments in, e.g., inkjet ink compositions. In printing applications, there is a continuing need to develop pigments and ink formulations that, when deposited on a substrate such as paper, produce a printed product having high optical density (O.D.). Often, high O.D. is associated with larger sized particles as these have a lesser tendency to penetrate the pores of the paper. However, larger sized particles generally trend toward poorer sedimentation performance, a disadvantageous property for long term storage of inkjet ink formulations, e.g., in cartridges. It has been discovered that a combination of larger oil absorption number (OAN) and STSA values (e.g., within a range of BET surface area values) can achieve the compromise between O.D. and sedimentation.

In one embodiment, the OAN ranges from 170 to 220 mL/100 g, e.g., from 170 to 210 mL/100 g, from 180 to 220 mL/100 g, from 180 to 210 mL/100 g, from 190 to 220 mL/100 g, or from 190 to 210 mL/100 g. OAN can be determined according to ASTM-D2414. Without wishing to be bound by any theory, it has believed that the disclosed OAN values can be a significant factor in achieving high optical density values.

In one embodiment, the STSA ranges from 160 to 220 $m^2/g$, e.g., from 160 to 210 $m^2/g$, and in certain applications, the STSA ranges from 170 to 220 $m^2/g$, from 170 to 210 $m^2/g$, from 180 to 220 $m^2/g$, or from 180 to 220 $m^2/g$.

Another embodiment provides a carbon black having the following properties:

OAN ≥170 mL/100 g; and
STSA ranging from 160 to 220 $m^2/g$; and
BET surface area ranging from 190 to 275 $m^2/g$.

Without wishing to be bound by any theory, it is believed that high STSA values and a certain range of BET surface areas achieve good sedimentation performance, as indicated by lower sedimentation rates (%, as determined by the method of Example 6). In one embodiment, the BET surface area ranges from 200 to 270 $m^2/g$, such as a surface area ranging from 200 to 260 $m^2/g$. The BET surface area can be determined according to ASTM-D6556.

Another embodiment involves the discovery that good printing and sedimentation performance can be achieved with carbon blacks having low internal volume, as determined by a ratio of STSA/BET ranging from 0.7 to 1. A ratio of STSA/BET of 1 represents the limit when the carbon black has substantially no internal porosity. In another embodiment, this range of STSA/BET ratios can be useful for applications incorporating conductive carbon blacks.

In one embodiment, the ratio of STSA/BET ranges from 0.7 to 0.9, or a ratio of STSA/BET ranging from 0.7 to 0.8. In another embodiment, the ratio of STSA/BET ranges from 0.8 to 1 or from 0.9 to 1. In one embodiment, a ratio of STSA/BET ranging from 0.7 to 1 is achieved by minimizing the etching during carbon black formation. In one embodiment, the carbon black can have the STSA and/or BET values disclosed herein.

In one embodiment, the carbon black has a compressed OAN (COAN) of at least 120 mL/100 g, e.g., at least 125 mL/100 g, at least 130 mL/100 g, at least 135 mL/100 g, or a COAN ranging from 120-145 mL/100 g.

In one embodiment, the carbon black has a ratio of OAN/COAN ranging from 1.30 to 1.50, e.g., from 1.30 to 1.45.

The carbon blacks disclosed herein can be useful in applications such as inkjet commercial printing (large or wide format printing, industrial printing). In contrast to office printers, commercial printers have overall dimensions in the multi-foot or multi-meter range. Certain of these printers may employ ink cartridges having a stirrer assembly to stabilize the dispersion. In such cartridges, sedimentation rates of the solids are not as significant a factor as in office printers. Accordingly, another embodiment provides high structure carbon blacks having a high OAN and COAN values. In one embodiment, a carbon black has the following properties:

OAN ≥170 mL/100 g;
BET surface area ≥150 $m^2/g$; and
COAN of at least 130 mL/100 g.

In another embodiment, the carbon black has the following properties:

OAN ≥170 mL/100 g;
BET surface area ≥150 $m^2/g$; and
COAN ranging from 130 to 145 mL/100 g.

In one embodiment, the OAN ranges from 180 to 220 mL/100 g, from 180 to 210 mL/100 g, from 190 to 220 mL/100 g, or from 190 to 210 mL/100 g. In one embodiment, the BET surface area ranges from 150 $m^2/g$ to 260 $m^2/g$, from 150 $m^2/g$ to 220 $m^2/g$, from 160 $m^2/g$ to 260 $m^2/g$, from 160 $m^2/g$ to 220 $m^2/g$, from 170 $m^2/g$ to 260 $m^2/g$, from 170 $m^2/g$ to 220 $m^2/g$, from 180 $m^2/g$ to 260 $m^2/g$, or from 180 $m^2/g$ to 220 $m^2/g$. In one embodiment, the OAN/COAN ratio ranges from 1.30 to 1.50, e.g., from 1.30 to 1.45. In one embodiment, the STSA ranges from 130 $m^2/g$ to 220 $m^2/g$, e.g., from 130 $m^2/g$ to 200 $m^2/g$.

Another embodiment relates to dispersions comprising the carbon blacks disclosed herein. The dispersion can be aqueous or nonaqueous. In one embodiment, the carbon blacks are treated to render them self-dispersible. For example, the carbon black can be an oxidized carbon black, e.g., having an oxygen content greater than or equal to 3%, which can be determined by methods known in the art (e.g., elemental analysis).

Generally, oxidized blacks feature a surface having ionic or ionizable, oxygen-containing groups such as one or more of phenols, lactones, carbonyls, carboxyls (e.g., carboxylic acids), anhydrides, ethers, and quinones. The extent of oxidation of carbon black can determine the surface concentration of such ionic or ionizable groups. The carbon blacks disclosed herein can be oxidized by a variety of oxidizing agents known in the art. Exemplary oxidizing agents for carbon blacks include oxygen gas, ozone, $NO_2$ (including mixtures of $NO_2$ and air), peroxides such as hydrogen peroxide, persulfates such as sodium, potassium, and ammonium persulfate, hypohalites such as sodium hypochlorite, halites, halates, or perhalates (such as sodium chlorite, sodium chlorate, or sodium perchlorate), oxidizing acids such as nitric acid, and transition metal-containing oxidants such as permanganate salts, osmium tetroxide, chromium oxides, ceric ammonium nitrates, and mixtures thereof, e.g., mixtures of gaseous oxidants such as oxygen and ozone. In one embodiment, the carbon blacks disclosed herein are oxidized via ozone oxidation.

In one embodiment, the carbon black is modified with at least one organic group. In one embodiment, the organic group is attached to the carbon black, where an "attached" organic group can be distinguished from an adsorbed group in that a soxhlet extraction for several hours (e.g., at least 4, 6, 8, 12, or 24 hours) will not remove the attached group from the pigment (e.g., carbon black). In another embodiment, the organic group is attached to the pigment (e.g., carbon black) if the organic group cannot be removed after repeated washing (e.g., 2, 3, 4, 5, or more washings) with a solvent or solvent mixture that can dissolve the starting organic treating material but cannot disperse the treated pigment. In yet another embodiment, "attached" refers to a bond such as a covalent bond, e.g., a pigment (e.g., carbon black) bonded or covalently bonded to the organic group.

In one embodiment, the carbon black, whether as a raw material, an oxidized black, or a modified black (e.g., having an attached organic group), can be provided in dry form, such as a powder, pellet, granule, or cake. In one embodiment, "dry" refers to a material being substantially free of water and optionally free of volatile material. In one embodiment, dry forms include volatile material, such as about 50% or more of a volatile solvent.

In one embodiment, the carbon black is provided in the form having the consistency of, for example, a paste or putty in a solid or semi-solid form (containing aqueous and/or nonaqueous materials/solvents), a slurry in which the carbon black is provided as an aqueous or nonaqueous dispersion, or as a bulk powder that can be a free flowing or a tacky powder.

The oxidized or modified carbon blacks disclosed herein can provide useful properties when present in a dispersion. In one embodiment, the carbon black in the dispersion has a mean volume (mV) ranging from 0.07 to 0.18 µm, e.g., from 0.1 to 0.18 µm. In another embodiment, the carbon black has a D10 ranging from 0.03 to 0.1 µm, e.g., from 0.05 to 0.1 µm, such as a D10 ranging from 0.06 to 0.1 µm, or from 0.07 to 0.1 µm. In one embodiment, the carbon black has a D50 ranging from 0.07 to 0.16 µm, e.g., from 0.1 to 0.16 µm. In another embodiment, the carbon black has a D90 ranging from 0.15 to 0.25 µm, e.g., from 0.18 to 0.25 µm, such as a D90 ranging from 0.15 to 0.24 µm, or a D90 ranging from 0.18 to 0.24 µm.

The dispersion can be prepared by using any method known in the art. For example, the modified pigment in a dry form may be combined with the liquid vehicle with agitation to produce a stable dispersion. Any equipment known in the art, such as a media or ball mill, or other high shear mixing equipment can be used, and various conventional milling media may also be used. Other methods for forming the dispersion will be known to one skilled in the art.

In one embodiment, the dispersion comprises pigments such as the carbon blacks disclosed herein (e.g., oxidized carbon blacks or carbon blacks having at least one attached organic group), and a liquid vehicle, e.g., an aqueous or non-aqueous vehicle. In one embodiment, the vehicle contains water, e.g., the vehicle comprises an aqueous solution. In one embodiment, the aqueous solution contains greater than 50% by weight water and can be, for example, water or mixtures of water with water miscible solvents such as alcohols. In one embodiment, the amount of pigment present in the dispersion can be varied but is typically in an amount ranging from 0.1% to 30%, e.g., from 1% to 25%, from 1% to 20%, from 3% to 20%, from 3% to 15%, based on the total weight of the dispersion.

Another embodiment provides inkjet ink compositions comprising the dispersions disclosed herein. The amount of modified pigment used in the inkjet ink composition can be varied but is typically in an amount effective to provide the desired image quality (for example, optical density) without detrimentally affecting the performance of the inkjet ink. In one embodiment, the pigment such as the carbon blacks disclosed herein (e.g., oxidized carbon blacks or carbon blacks having at least one attached organic group) is present in the inkjet ink composition in an amount ranging from 0.1% to 20%, e.g., from 1% to 20%, from 1% to 10%, or from 3% to 8%, based on the total weight of the inkjet ink composition.

The inkjet ink composition can be formed with a minimum of additional components (additives and/or cosolvents) and processing steps. However, suitable additives may also be incorporated into these inkjet ink compositions to impart a number of desired properties while maintaining the stability of the compositions. For example, surfactants may be added to further enhance the colloidal stability of the composition. Other additives are well known in the art and include humectants, biocides and fungicides, binders such as polymeric binders, pH control agents, drying accelerators, penetrants, and the like. The amount of a particular additive will vary depending on a variety of factors but are generally present in an amount ranging between 0% and 40% based on the weight of the inkjet ink composition. Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, and lithium salts. Additional details on dispersions and the inkjet ink compositions are provided below.

Ozone Oxidation

While the carbon blacks disclosed herein may be oxidized by any method known in the art (as described herein), another embodiment provides a method of oxidizing a pigment, such as the carbon blacks disclosed herein. Alternatively, the disclosed ozone oxidation method is not limited to the carbon blacks disclosed herein and can be used to oxidize any pigment, e.g., other carbon blacks or organic pigments. One embodiment provides a method of oxidizing a pigment comprising adding ozone to an aqueous dispersion comprising the pigment while maintaining the aqueous dispersion at a pH of at least 8.5. In one embodiment, the pH is maintained at a value of at least 8.6, at least 8.7, at least 8.8, at least 8.9, at least 9.0, at least 9.1, at least 9.2, at least 9.3, at least 9.4, or at least 9.5. In one embodiment, the pH of the mixture is maintained at a value ranging from 8.5 to 10, 8.5 to 9.5, 8.6 to 10, 8.6 to 9.5, 8.7 to 10, 8.7 to 9.5, 8.8 to 10, 8.8 to 9.5, 8.9 to 10, 8.9 to 9.5, 9.0 to 10, or from 9.0 to 9.5. In one embodiment, the oxidizing and maintaining are performed while the aqueous dispersion flows in a circulated pathway.

In one embodiment, the maintaining comprises adding a base to the aqueous dispersion when the pH level falls to a level below 8.5 (i.e., less than 8.5), e.g., less than 8.6, less than 8.7, less than 8.8, less than 8.9, less than 9.0, less than 9.1, less than 9.2, less than 9.3, less than 9.4, or less than 9.5. For example, if it is desired that the pH level remain at a value of at least 8.5 or at least 9.0 (e.g., from 9.0 to 10.0), the maintaining can be achieved with a pH probe and base pump in which the pH probe senses a drop in the pH level of the mixture to below 8.5 (or below 9.0) as the oxidation proceeds. In response, the base pump automatically adds a sufficient amount of base (e.g., NaOH, KOH) to cause the pH level to rise above 8.5 or above 9.0, or any of the values disclosed herein. In one embodiment, the aqueous dispersion passes in a circulating flow through a venturi tube, and the adding comprises introducing ozone to an inlet of the venturi tube, wherein the inlet is positioned at or upstream a constricted region of the venturi tube.

One embodiment for achieving the ozone oxidization method comprises an ozone reactor assembly having a circulated pathway. In one embodiment, the ozone reactor assembly comprises:

a reservoir for containing and agitating a dispersion comprising a pigment, the aqueous dispersion being in fluid communication with a pH probe and a first pump for delivering a base to the dispersion;

a second pump in fluid communication with the reservoir for withdrawing and delivering the aqueous dispersion through a first hosing to a venturi tube, wherein the aqueous dispersion passes through a constricted region of the venturi tube;

a source of ozone in gaseous communication with the venturi tube via an inlet at or upstream the constricted region, wherein the ozone contacts the pigment while passing through the constricted region; and a second hosing for carrying a mixture comprising ozone and the aqueous dispersion to the reservoir.

FIG. 2 schematically illustrates an embodiment of an ozone reactor assembly. Reactor 50 comprises a reservoir 52 for containing a mixture 54 comprising at least a pigment and solvent. In one embodiment, this mixture is a dispersion containing the carbon blacks disclosed herein, although other carbon black or organic pigments can be oxidized with this assembly. The mixture can be agitated by any method known in the art, such as by stirring, rotating, vibrating, etc. FIG. 2 illustrates a stirrer assembly 56. Component 58 is in fluid communication with the mixture 54 and comprises a base pump, for introducing base to the mixture 54 to maintain its basicity, and a pH probe for monitoring the pH of the solution. The base pump and pH probe can be provided as separate components or as an integrated component. In one embodiment component 58 monitors the pH level and maintains the pH of the mixture to at least 8.5, or at least 9.0, or any of the values disclosed herein.

A fluid pump 60, in fluid communication with the mixture 54, draws the mixture from reservoir 52, causing the mixture 54 to flow from reservoir 52 through hosing 62 in a direction indicated by arrows 64. The mixture 54 then enters a venturi tube 70 at inlet port 65. As schematically shown in FIG. 2, the diameter of venturi tube 70 decreases at section 72 and minimizes at a constricted diameter region 74. The diameter decrease of section 72 leading to and including the constricted diameter region 74 is illustrated in conical fashion but may be achieved by a number of configurations, e.g., stepwise or continually, in a linear, circular, coiled, serpentine, or tortuous pathway. Constricted diameter region 74 connects to another inlet 69 through which ozone is introduced via hosing 68. The ozone can be generated by passing an oxygen gas from source 66 (e.g., a gas tank containing dried oxygen) to a corona generator 67. Corona generators typically generate an electrical discharge capable of splitting oxygen molecules. The formed oxygen radicals can react with oxygen molecules to yield ozone. Other ozone generating systems can also be applied to reactor assembly 50. As the formed ozone enters the venturi tube at inlet 69 and into the constricted diameter region 74, it contacts the pigment at the highest concentrated pigment-containing region. Moreover, flow through the constricted diameter region 74 maximizes the shearing forces, thereby optimizing the reaction conditions between ozone and pigment. In one embodiment, these advantages can also be realized if ozone is introduced upstream the constricted diameter region 74 where the resulting mixture subsequently passes through this region for additional mixing and reaction.

The resulting mixture 54 (dispersion/ozone) eventually exits constricted diameter region 74 via region 76 having an increased diameter in relation to constricted diameter region 74. Upon exiting the venturi tube 70, the mixture 54 travels through a second set of hosing 80 to be reintroduced back to the reservoir 52. With this assembly, the pigment can recirculate a number of times through the venturi tube 70 for additional exposure to reactant ozone.

The carbon blacks disclosed herein can be subjected to a number of alternative surface treatments and incorporated in various dispersion formulations, as described below.

Organic Groups

In one embodiment, the carbon black is a modified carbon black having at least one attached organic group.

The organic group may be an aliphatic group, a cyclic organic group, or an organic compound having an aliphatic portion and a cyclic portion. In one embodiment, the organic group is attached via a diazonium salt derived from a primary amine capable of forming, even transiently, a diazonium salt. Other methods of attachment are described below. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl), and heteroaryl groups (imidazolyl, pyrazolyl, pyridinyl, thienyl, thiazolyl, furyl, indolyl, and triazolyl, such as 1,2,4-triazolyl and 1,2,3-triazolyl).

In one embodiment, the at least one attached organic group comprises at least one ionic group, ionizable group, or mixtures of an ionic group and an ionizable group. An ionic group can be either anionic or cationic and can be associated with a counterion of the opposite charge including inorganic or organic counterions, such as $Na^+$, $K^+$, $Li^+$, $NH_4^+$, $NR'_4^+$, acetate, $NO_3^-$, $SO_4^{2-}$, $R'SO_3^-$, $R'OSO_3^-$, $OH^-$, or $Cl^-$, where R' represents hydrogen or an organic group, such as a substituted or unsubstituted aryl or alkyl group. An ionizable group is one that is capable of forming an ionic group in the medium of use. Anionic groups are negatively charged ionic groups that can be generated from groups having ionizable substituents that can form anions (anionizable groups), such as acidic substituents. Cationic groups are positively charged organic ionic groups that can be generated from ionizable substituents that can form cations (cationizable groups), such as protonated amines. Specific examples of anionic groups include —$COO^-$, —$SO_3^-$, —$OSO_3^-$, —$HPO_3$; —$OPO_3^{2-}$, or —$PO_3^{2-}$, and specific examples of an anionizable group can include —$COOH$, —$SO_3H$, —$PO_3H_2$, —R'SH, or —R'OH, where R' represents hydrogen or an organic group, such as a substituted or unsubstituted aryl or alkyl group. Also, specific examples of cationic or cationizable groups include alkyl or aryl amines, which can be protonated in acidic media to form ammonium groups —$NR'_2H^+$, where R' represent an organic group, such as a substituted or unsubstituted aryl or alkyl groups. Organic ionic groups include those described in U.S. Pat. No. 5,698,016, the disclosure of which is incorporated herein by reference.

For example, the attached group may be an organic group such as a benzene carboxylic acid group (—$C_6H_4$—COOH group), a benzene dicarboxylic acid group, a benzene tricarboxylic acid group, a benzene sulfonic acid group (a —$C_6H_4$—$SO_3H$ group), or salts thereof. In one embodiment, surface modification to introduce ionic or ionizable groups onto a pigment surface, such as chlorination and sulfonylation, may also be used.

In one embodiment, the organic group can be attached either directly (bonding to a native atom of the carbon black) or indirectly via an intermediary or spacer group. In one embodiment, the intermediary or spacer group is selected from substituted and unsubstituted $C_1$-$C_{12}$ alkyl, $C_5$-$C_{20}$ aryl, $C_6$-$C_{24}$ alkyaryl and aralkyl, wherein "alkyl" can be optionally interrupted by a group containing a heteroatom selected from N, O, and S, and "aryl" includes ring carbon atoms optionally replaced by a group containing a heteroatom selected from N, O, and S. Typically, the attached group resides at the pigment surface.

The organic group can be substituted or unsubstituted. In one embodiment, the organic group is substituted with at least one functional group selected from esters, amides, ethers, carboxyls, aryls, alkyls, halides, sulfonates, sulfates, phosphonates, phosphates, carboxylates, OR", COR", $CO_2R$", OCOR", CN, NR"$_2$, $SO_2$, CO, $SO_3$, $SO_3H$, $OSO_2$, $OSO_3$, $SO_3NR$", R"$NSO_2$, NR"(COR"), NR"CO, CONR"$_2$, $NO_2$, $NO_3$, CONR", NR"$CO_2$, $O_2$CNR", NR"CONR", S, NR", SO$_2$C$_2$H$_4$, arylene as defined above, alkylene as defined above, wherein R", which can be the same or different, represents an organic group such as hydrogen, aryl, and alkyl, as defined herein.

Further examples of representative organic groups are described in U.S. Pat. Nos. 5,571,311; 5,630,868; 5,707,432; 5,955,232; 5,922,118; 5,900,029; 5,895,522; 5,885,335; 5,851,280; 5,837,045; 5,713,988; and 5,803,959; PCT Publication No. WO 96/18688; and PCT Publication No. WO 96/18690, the disclosures of which are incorporated herein by reference.

In one embodiment, the organic group contains a 5-membered heteroaromatic group comprising at least two ring heteroatoms, such as those disclosed in PCT Pub. No. WO 2011/143533, the disclosure of which is incorporated herein by reference. In one embodiment, the For example, the organic group can have formula (Ib) or (IIb):

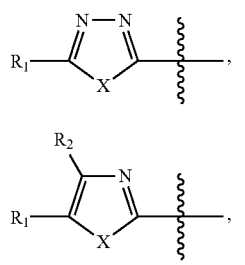

For Ib, X can be O, N(R$_a$), or S; and R$_1$ can be H, C$_1$-C$_{10}$ alkyl, C$_2$-C$_{10}$ alkenyl, C$_2$-C$_{10}$ alkynyl, C$_3$-C$_{20}$ cycloalkyl, C$_3$-C$_{20}$ cycloalkenyl, C$_1$-C$_{20}$ heterocycloalkyl, C$_1$-C$_{20}$ heterocycloalkenyl, aryl, heteroaryl, halo, cyano, OR$_b$, COOR$_b$, OC(O)R$_b$, C(O)R$_b$, C(O)NR$_b$R$_c$, SO$_3$R$_c$, NR$_b$R$_c$, or N$^+$(R$_b$R$_c$R$_d$)Y, in which each of R$_a$, R$_b$, R$_c$, and R$_d$, independently, can be H, C$_1$-C$_{10}$ alkyl, C$_3$-C$_{20}$ cycloalkyl, C$_1$-C$_{20}$ heterocycloalkyl, aryl, or heteroaryl and Y can be an anion. In general, Y can be any suitable anion, such as chloride, bromide, iodide, sulfate, nitrate, phosphate, citrate, methanesulfonate, trifluoroacetate, acetate, malate, tosylate, tartrate, fumarate, glutamate, glucuronate, lactate, glutarate, or maleate. For IIb, X is O, N(R$_a$), or S; and each of R$_1$ and R$_2$, independently, is H, C$_1$-C$_{10}$ alkyl, C$_2$-C$_{10}$ alkenyl, C$_2$-C$_{10}$ alkynyl, C$_3$-C$_{20}$ cycloalkyl, C$_3$-C$_{20}$ cycloalkenyl, C$_1$-C$_{20}$ heterocycloalkyl, C$_1$-C$_{20}$ heterocycloalkenyl, aryl, heteroaryl, halo, cyano, OR$_b$, COOR$_b$, OC(O)R$_b$, C(O)R$_b$, C(O)NR$_b$R$_c$, SO$_3$R$_c$, NR$_b$R$_c$, or N$^+$(R$_b$R$_c$R$_d$)Y, each of R$_a$, R$_b$, R$_c$, and R$_d$, independently, being H, C$_1$-C$_{10}$ alkyl, C$_3$-C$_{20}$ cycloalkyl, C$_1$-C$_{20}$ heterocycloalkyl, aryl, or heteroaryl and Y being an anion; provided that at least one of R$_1$ and R$_2$ is not H.

In one embodiment, the at least one organic group comprises the formula —[R(A)]-, wherein:
R is attached to the carbon black and is selected from arylene, heteroarylene, and alkylene, and
A is selected from carboxylic acids, sulfonic acids, phosphonic acids, hydroxyls, amines, and esters, amides, and salts thereof.

In another embodiment, the at least one organic group comprises the formula —[R(A)]-, wherein:
R is attached to the carbon black and is selected from arylene, heteroarylene, and alkylene, and
A is selected from hydrogen, alkyls, aryls, heteroaryls, alkylene oxides (e.g., ethylene or propylene oxide), carboxylic acid esters, and glycols.

In another embodiment, the at least one organic group comprises the formula —[R(A)]-, wherein:
R is attached to the carbon black and is selected from arylene, heteroarylene, and alkylene, and
A is selected from polymers.

The arylene, heteroarylene, and alkylene can be unsubstituted or substituted, e.g., with one or more of the functional groups listed above. Exemplary arylenes include phenylene, naphthylene, and biphenylene, and exemplary heteroarylenes include phenylene, naphthylene, and biphenylene having a ring carbon substituted with one or more oxygen or nitrogen atoms. In one embodiment, the arylene is a C$_5$-C$_{20}$ arylene. Heteroarylenes can be an arylene as defined herein which one or more ring carbon atoms is replaced with a heteroatom, e.g., N, O, and S. The heteroatom can be bonded to other groups in addition to being a ring atom. Exemplary arylenes include phenyl, naphthyl, anthracenyl, phenanthrenyl, biphenyl, and exemplary heteroarylenes include pyridinyl, imidazolyl, pyrazolyl, thienyl, thiazolyl, furyl, triazinyl, indolyl, benzothiadiazolyl, and benzothiazolyl. Alkylenes may be branched or unbranched. The alkylene may be a C$_1$-C$_{12}$ alkylene such as methylene, ethylene, propylene, or butylene, optionally interrupted by a heteroatom.

In one embodiment, R is a substituted R and comprises an arylene, heteroarylene, and alkylene substituted with at least a spacer group that is bonded to A. In one embodiment, a substituted R comprises R'—Sp, wherein R' is selected from arylene, heteroarylene, and alkylene, as defined above, and Sp is a spacer selected from the functional groups listed above capable of bonding to both R' and A. In another embodiment, Sp is selected from —CO$_2$—, —O$_2$C—, —CO—, —OSO$_2$—, —SO$_3$—, —SO$_2$—, —SO$_2$C$_2$H$_4$—O—, —SO$_2$C$_2$H$_4$S—, —SO$_2$C$_2$H$_4$NR"—, —O—, —S—, —NR"—, —NR"CO—, —CONR"—, —NR"CO$_2$—, —O$_2$CNR"—, —NR"CONR"—, —N(COR")CO—, —CON(COR")—, —NR"COCH(CH$_2$CO$_2$R")— and cyclic imides therefrom, —NR"COCH$_2$CH(CO$_2$R")— and cyclic imides therefrom, —CH(CH$_2$CO$_2$R")CONR"—, and cyclic imides therefrom, —CH(CO$_2$R")CH$_2$CONR" and cyclic imides therefrom, (including phthalimide and maleimides of these), sulfonamide groups (including —SO$_2$NR"— and —NR"SO$_2$-groups), arylene groups, alkylene groups. R", which can be the same or different, is defined as above, or represents hydrogen or an organic group such as a substituted or unsubstituted aryl or alkyl group, e.g., C$_5$-C$_{20}$ aryl groups, and substituted and unsubstituted C$_1$-C$_6$ alkyl groups. In one embodiment, Sp is selected from —CO$_2$—, —O$_2$C—, —O—, —NR"—, —NR"CO—, —CONR"—, —SO$_2$NR"—, —SO$_2$CH$_2$CH$_2$NR"—, —SO$_2$CH$_2$CH$_2$O—, or —SO$_2$CH$_2$CH$_2$S— wherein R" is defined as above, e.g., selected from H and C$_1$-C$_6$ alkyl groups.

In another embodiment, Sp is derived from a compound having a reactive group selected from a carboxylic acid or ester, an acid chloride, a sulfonyl chloride, an acyl azide, an isocyanate, a ketone, an aldehyde, an anhydride, an amide, an imide, an imine, an α,β-unsaturated ketone, aldehyde, or sulfone, an alkyl halide, an epoxide, an alkyl sulfonate or sulfate such as a (2-sulfatoethyl)-sulfone group, an amine, a hydrazine, an alcohol, a thiol, a hydrazide, an oxime, a triazene, a carbanion, an aromatic compound, salts or derivatives thereof, or any combination thereof. Examples of such compounds include include amino-functionalized aromatic compounds, such as 4-aminobenzyl amine (4-ABA), 3-aminobenzyl amine (3-ABA), 2-aminobenzyl amine (2-ABA), 2-aminophenyl ethylamine, 4-aminophenyl-(2-sulfatoethyl)- sulphone, (APSES), p-aminobenzoic acid (PABA), 4-aminophthalic acid (4-APA), and 5-aminobenzene-1,2,3-tricarboxylic acid.

In one embodiment, the at least one organic group is capable of binding calcium (e.g., having defined calcium index values), including those organic groups described in PCT Pub. No. WO 2007/053564, the disclosure of which is incorporated herein by reference. For example, the organic group comprises at least one geminal bisphosphonic acid group, partial esters thereof, or salts thereof, e.g., a group having the formula —CQ(PO$_3$H$_2$)$_2$, partial esters thereof, or salts thereof, wherein Q is bonded to the geminal position and may be H, R, OR, SR, or NR$_2$ wherein R", which can be the same or different, is defined as above, or can be H, a C$_1$-C$_{18}$ saturated or unsaturated, branched or unbranched alkyl group, a C$_1$-C$_{18}$ saturated or unsaturated, branched or unbranched acyl group, an aralkyl group, an alkaryl group, or an aryl group. In addition, U.S. Pat. Nos. 5,672,198, 5,922,118, 6,042,643, and 6,641,656 disclose modified pigments having various attached groups, including phosphonic acid groups, the disclosures of which are incorporated herein by reference.

Other organic groups capable of binding calcium include: at least one hydroxamic acid group or salt thereof (e.g., at least one group having the formula —N(OH)—CO— or a salt thereof); at least one heteroaryl group having at least one OH group or salt thereof (e.g., a nitrogen-containing heteroaryl group, such as a pyridinyl group or a quinolinyl group, and the organic group is a hydroxy pyridinyl group or a hydroxy quinolinyl group, in which the hydroxy group is at a position on the heteroaryl group such that it is geometrically close to the heteroatom, such as ortho to the heteroatom; or a heteroaryl having two OH groups in positions ortho to each other); at least one phosphonic acid group or salt thereof and at least one second ionic, ionizable or basic group (a basic group is a Lewis base, such as an OH group or an amino group that can be geminal to the phosphonic acid group); at least one heteroaryl group having at least one carboxylic acid group or salt thereof (e.g., at least two or three carboxylic acid groups, such as at least two carboxylic acid groups that are ortho or meta to each other); an aryl group having at least one nitroso group and at least one OH group (e.g., ortho to each other), or a salt thereof; an azoarene group having at least two OH groups, at least two NH$_2$ groups, or at least one OH group and at least one NH$_2$ group (e.g., at least two OH groups, at least two NH$_2$ groups, or at least one OH group and at least one NH$_2$ group) and has the formula Ar$^1$—N=N—Ar$^2$, wherein Ar$^1$ and Ar$^2$, which can be the same or different, are an arylene group or an aryl group and at least one of Ar$^1$ or Ar$^2$ is an arylene group (e.g., the OH and/or NH$_2$ groups are located at positions ortho to the azo group). Other groups are disclosed in WO 2007/053564.

In one embodiment, the attached organic group comprises a polymer. In one embodiment, the polymer comprises at least one non-ionic group. Examples include alkylene oxide groups of from about 1 to about 12 carbons and polyols, such as a —CH$_2$—CH$_2$—O— group, a —CH(CH$_3$)—CH$_2$—O— group, a —CH$_2$—CH(CH$_3$)—O— group, a —CH$_2$CH$_2$CH$_2$—O— group, or combinations thereof. These non-ionic groups may further comprise at least one ionic or ionizable group as disclosed herein.

The attached polymers, which can be homopolymers or copolymers, can also be derived from monomers selected from acrylic and methacrylic acid, acrylate esters, methacrylate esters, acrylamides and methacrylamides, acrylonitriles, cyanoacrylate esters, maleate and fumarate diesters, vinyl pyridines, vinyl N-alkylpyrroles, vinyl acetate, vinyl oxazoles, vinyl thiazoles, vinyl pyrimidines, vinyl imidazoles, vinyl ketones, vinyl ethers, and styrenes. Vinyl ethers include those that can be prepared by cationic polymerization, such as those having the general structure CH$_2$=CH(OR), wherein R is an alkyl, aralkyl, alkaryl, or aryl group or is a group comprising one or more alkylene oxide groups. Vinyl ketones include those in which the β-carbon atom of the alkyl group does not bear a hydrogen atom, such as vinyl ketones in which both β-carbons bear a C$_1$-C$_4$ alkyl group, halogen, etc. or a vinyl phenyl ketone in which the phenyl group may be substituted with from 1 to 5 C$_1$-C$_6$ alkyl groups and/or halogen atoms. Styrenes include those in which the vinyl group is substituted with a C$_1$-C$_6$ alkyl group, such as at the a-carbon atom, and/or those in which the phenyl group is substituted with from 1 to 5 substituents including a C$_1$-C$_6$ alkyl, alkenyl (including vinyl), or alkynyl (including acetylenyl) group, a phenyl group, a haloalkyl group, and functional groups such as C$_1$-C$_6$ alkoxy, halogen, nitro, carboxy, sulfonate, C$_1$-C$_6$ alkoxycarbonyl, hydroxy (including those protected with a C$_1$-C$_6$ acyl group), and cyano groups. Specific examples include methyl acrylate (MA), methyl methacrylate (MMA), ethyl acrylate (EA), ethyl methacrylate (EMA), butyl acrylate (BA), 2-ethylhexyl acrylate (EHA), acrylonitrile (AN), methacrylonitrile, styrene, and derivatives thereof.

The polymer can be prepared by the cationic or anionic polymerization of one or more polymerizable monomers. For example, polyvinyl ethers can be prepared by cationic polymerization of monomers, such as those having the general structure CH$_2$=CH(OR), wherein R is an alkyl, aralkyl, alkaryl, or aryl group or is a group comprising one or more alkylene oxide groups. Other cationically or anionically polymerizable monomers can also be included.

The polymer can also be prepared by polycondensation techniques. For example, the polymer may be a polyester or a polyurethane having a functional group described above. For polyurethanes, examples of suitable methods include a solution method which comprises preparing an isocyanate-terminated prepolymer in a low boiling solvent (such as acetone) unreactive with an isocyanate group, introducing a hydrophilic group such as diamine or polyol therein, effecting phase change by diluting with water, and distilling off a solvent to obtain a polyurethane dispersion. Another suitable method comprises preparing an isocyanate group-terminated prepolymer having a hydrophilic group introduced, dispersing in water, and extending a chain with an amine.

Polyurethanes may be prepared by the prepolymer method, and a polyhydroxy compound having a low molecular weight may be used at that time. Examples of the polyhydroxy compound having a low molecular weight include polyester diols such as glycol and alkylene oxide, a trihydric alcohol such as glycerin, trimethylolethane and trimethylolpropane.

In one embodiment, the polymer has a low acid number. In one embodiment, the polymer may be an acidic group containing polymer having an acid number of less than or equal to about 200, such as less than or equal to about 150, less than or equal to about 110, or less than or equal to about 100. In another embodiment, the acid number of the polymer is greater than or equal to about 30. Thus, the polymer may be an acidic group containing polymer having an acid number of from about 30 to about 200, such as from about 30 to about 110, from about 110 to about 150, or from about 150 to about 200.

In one embodiment, the carbon black is modified with at least one organic group via a diazonium treatment as detailed, for instance, in the following patents: U.S. Pat. Nos. 5,554,739; 5,630,868; 5,672,198; 5,707,432; 5,851,280; 5,885,335;

5,895,522; 5,900,029; 5,922,118; 6,042,643; 6,534,569; 6,398,858 and 6,494,943 (high shear conditions) U.S. Pat. Nos. 6,372,820; 6,368,239; 6,350,519; 6,337,358; 6,103,380; 7,173,078; 7,056,962; 6,942,724; 6,929,889; 6,911,073; 6,478,863; 6,472,471; and WO 2011/143533, the disclosures of which are incorporated herein by reference. In one embodiment, the attachment is provided via a diazonium reaction where the at least one organic group has a diazonium salt substituent. In another embodiment, the direct attachment can be formed by using the diazonium and stable free radical methods described, for instance, in U.S. Pat. Nos. 6,068,688; 6,337,358; 6,368,239; 6,551,393; 6,852,158, the disclosures of which are incorporated herein by reference, which makes use of reacting at least one radical with at least one particle, wherein a radical is generated from the interaction of at least one transition metal compound with at least one organohalide compound in the presence of one or more particles capable of radical capture, and the like. In yet another embodiment, the at least one carbon black can be modified (e.g., to attach functional groups) by using the methods of U.S. Pat. Nos. 5,837,045, 6,660,075 and WO 2009/048564 (reaction with organic compounds containing a C—C double bond or triple bond activated by at least one substituent) or U.S. Pub. No. 2004/0171725, U.S. Pat. Nos. 6,664,312, 6,831,194 (reaction with anhydride component), U.S. Pat. No. 6,936,097, U.S. Pub. Nos. 2001/0036994, 2003/0101901 (reaction with organic groups having —N═N—N— group), Canadian Patent No. 2,351,162, European Patent No. 1 394 221, and PCT Publication Nos. WO 01/51566 (reaction between at least one electrophile and at least one nucleophile), WO 04/63289, WO 2010/141071 (reaction with H2N-A-Y where A is a heteroatom), and WO 99/23174, the disclosures of which are incorporated herein by reference.

In one embodiment, the carbon black is attached to the organic group via an —O—C— bond, wherein the —O—C— bond forms one or more of phenolate, naphtholate, ester, and ether linkages wherein the carbon atom of the —O—C— bond, and substituents thereof, are not native to the carbon black prior to modification. In one embodiment, and carbon black is attached to the organic group via phenolate or naphtholate linkages in which the aromatic groups of the phenolate or napthtolate are native to the carbon black. In one embodiment, these linkages can be achieved via a Mitsunobu reaction, as disclosed in PCT App. No. PCT/US2013/39381, in which a first reactant comprising a protonated nucleophile having a pKa <15 is reacted with a second reactant comprising a hydroxyl-containing organic group. The carbon black can be attached to either the first or second reactant.

Other methods to prepare modified pigments, including those having attached polymeric groups, have also been described in, for example, PCT Publication No. WO 01/51566, which discloses methods of making a modified pigment by reacting a first chemical group and a second chemical group to form a pigment having attached a third chemical group. PCT Pub. No. WO 2007/053563 discloses modified colorants having attached at least one polymeric group comprising a polymer having at least one functional group having defined calcium index values. Specific embodiments of the organic groups are described, including organic groups comprising at least one geminal bisphosphonic acid group, partial esters thereof, or salts thereof.

Other methods for the preparation of polymer modified pigment products have also been developed. For example, U.S. Pat. Nos. 7,056,962, 6,478,863, 6,432,194, 6,336,965, U.S. Pub. No. 2006/0189717, and PCT Pub. No. WO 2008/091653 the disclosures of which are incorporated herein by reference, describe methods for attaching polymers to pigments through the use of a diazonium salt. U.S. Pat. Nos. 7,173,078, 6,916,367, 6,911,073, 6,723,783, 6,699,319, 6,472,471, and 6,110,994, the disclosures of which are incorporated herein by reference, disclose methods of preparing a polymer modified pigment by reacting polymer and a pigment having an attached reactive group. Modified pigments having attached polymeric groups have also been disclosed in U.S. Pub. No. 2008/0177003, the disclosure of which is incorporated herein by reference, utilizes a polymer in the form of a melt.

The polymer modified pigments may also be prepared by polymerization of monomers from a pigment. For example, the polymer modified pigments may be prepared by radical polymerization, controlled polymerization methods, such as atom transfer radical polymerization (ATRP), stable free radical (SFR) polymerization, and reversible addition-fragmentation chain transfer polymerization (RAFT), ionic polymerizations (anionic or cationic) such as group transfer polymerization (GTP), and condensation polymerization. Also, the polymer modified pigments may be prepared using the methods described in, for example, U.S. Pat. Nos. 6,372,820; 6,350,519; 6,551,393; or 6,368,239 or in PCT Pub. Nos. 2006/086599 and 2006/086660, the disclosures of which are incorporated herein by reference. For modified pigments comprising the pigment coated by the polymer, these modified pigments can be prepared using any method known in the art, such as those described in U.S. Pat. Nos. 5,085,698, 5,998,501, 6,074,467, 6,852,777, and 7,074,843, and International Patent Publication Nos. WO 2004/111,140, WO 2005/061087, and WO 2006/064193, the disclosures of which are incorporated herein by reference.

The surface grafting carbon black with polymers and prepolymers is described in N. Tsubokawa, in Prog. Polym. Sci., 17, 417, 1992, and J. Polym. Sci. Polym. Chem. Ed. Vol. 20, 1943-1946 (1982), the disclosures of which are incorporated herein by reference. Polymers having terminal hydroxyl or amino groups can be grafted onto surface carboxyl groups of the carbon black, as disclosed in N. Tsubokawa in Reactive & Functional Polymers 27 (1995) 75-81.

The modified pigments having attached at least one polymeric group may further comprise a second organic group, which is different from the polymeric groups described above. These include, for example, the groups described in U.S. Pat. No. 5,630,868, the disclosure of which is incorporated herein by reference. For example, the modified pigment may further comprise a second attached organic group that may comprise at least one ionic group, at least one ionizable group, or a mixture thereof. Preferably the ionic or ionizable group is an anionic or anionizable group. Any of the ionic or ionizable groups, particularly the anionic or anionizable groups, described above regarding the pigment of the modified pigment of the present invention may be the second organic group. Furthermore, the second organic group may be a polymeric group comprising a polymer. Any of the polymeric groups described above can also be used as the second attached organic group.

The amount of attached organic groups can be varied, depending on the desired use of the modified carbon black and the type of attached group. For example, the total amount of organic group may be from about 0.01 to about 10.0 micromoles of groups/$m^2$ surface area of pigment, as measured by nitrogen adsorption (BET method), including from about 0.5 to about 5.0 micromoles/$m^2$, from about 1 to about 3 micromoles/$m^2$, or from about 2 to about 2.5 micromoles/$m^2$. Additional attached organic groups, which differ from those described for the various embodiments of the present invention, may also be present.

Dispersions and Inkjet Ink Compositions

Dispersing agents (surfactants and/or dispersants) may be added to further enhance the colloidal stability of the composition or to change the interaction of the ink with either the printing substrate, such as printing paper, or with the ink printhead. Various anionic, cationic and nonionic dispersing agents can be used in conjunction with the ink composition of the present invention, and these may be used neat or as a water solution.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, a-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, included hydroxylated or aminated derivatives. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Representative examples of cationic surfactants include aliphatic amines, quaternary ammonium salts, sulfonium salts, phosphonium salts and the like.

Representative examples of nonionic dispersants or surfactants that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used. These nonionic surfactants or dispersants can be used alone or in combination with the aforementioned anionic and cationic dispersants.

The dispersing agents may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, polyvinylpyrrolidones, acrylic or methacrylic resins (often written as "(meth)acrylic") such as poly(meth)acrylic acid, acrylic acid-(meth)acrylonitrile copolymers, potassium (meth)acrylate-(meth)acrylonitrile copolymers, vinyl acetate-(meth)acrylate ester copolymers and (meth)acrylic acid-(meth)acrylate ester copolymers; styrene-acrylic or methacrylic resins such as styrene-(meth)acrylic acid copolymers, styrene-(meth)acrylic acid-(meth)acrylate ester copolymers, styrene-a-methylstyrene-(meth)acrylic acid copolymers, styrene-a-methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

Humectants and water soluble organic compounds may also be added to the inkjet ink composition of the present invention, particularly for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and 8-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidone; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

In one embodiment, the inkjet ink composition comprises a cosolvent. In one embodiment, the cosolvent is soluble or miscible in water at concentrations of at least 10% by weight and is also chemically stable to aqueous hydrolysis conditions (e.g., reaction with water under heat aging conditions, including, for example, the hydrolysis of esters and lactones). In one embodiment, the cosolvent has a dielectric constant below that of water, such as a dielectric constant ranging from about 10 to about 78 at 20° C. Examples of suitable cosolvents include low molecular-weight glycols (such as ethylene glycol, diethylene glycol, triethylene glycol, tetraethylene glycol, dipropylene glycol, ethylene glycol monomethyl ether, ethylene glycol monoethyl ether, triethylene glycol monomethyl or monoethyl ether, diethylene glycol monomethyl ether, diethylene glycol monoethyl ether, diethylene glycol monobutyl ether, and tetraethylene glycol monobutyl ether); alcohols (such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol); diols containing from about 2 to about 40 carbon atoms (such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, and poly(ethylene-co-propylene) glycol, as well as their reaction products with alkylene oxides, including ethylene oxides, including ethylene oxide and propylene oxide); triols containing from about 3 to about 40 carbon atoms (such as glycerine (glycerol), trimethylolethane, trimethylolpropane, 1,3,5-pentanetriol, 1,2,6-hexanetriol, and the like as well as their reaction products with alkylene oxides, including ethylene oxide, propylene oxide, and mixtures thereof); polyols (such as pentaerythritol); amides (such as dimethyl formaldehyde and dimethyl acetamide); ketones or ketoalcohols (such as acetone and diacetone alcohol); ethers (such as tetrahydrofuran and dioxane); lactams (such as 2-pyrrolidone, N-methyl-2-pyrrolidone, and ∈-caprolactam); ureas or urea derivatives (such as di-(2-hydroxyethyl)-5,5,-dimethyl hydantoin (dantacol) and 1,3-dimethyl-2-imidazolidinone); inner salts (such as betaine); and hydroxyamide derivatives (such as acetylethanolamine, acetylpropanolamine, propylcarboxyethanolamine, and propylcarboxy propanolamine, as well as their reaction products with alkylene oxides). Additional examples include saccharides (such as maltitol, sorbitol, gluconolactone and maltose); sulfoxide derivatives (symmetric and asymmetric) containing from about 2 to about 40 carbon atoms (such as dimethylsulfoxide, methylethylsulfoxide, and alkylphenyl sulfoxides); and sulfone derivatives (symmetric and asymmetric) containing from about 2 to about 40 carbon atoms (such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, and dimethylsulfolane). These cosolvents may be used alone or in combination.

The amount of the cosolvent can be varied depending on a variety of factors, including the properties of the cosolvent (solubility and/or dielectric constant), the type of modified pigment, and the desired performance of the resulting inkjet ink composition. In particular, the optional cosolvent may be used in amounts of less than or equal to about 40% by weight based on the total weight of the inkjet ink composition, including less than or equal to about 30% and less than or equal to about 20%. Also, when used, the amount of the optional cosolvent is greater than or equal to about 2% by weight based on the total weight of the inkjet ink composition, including greater than or equal to about 5% and greater than or equal to about 10% by weight.

EXAMPLES

Example 1

Preparation of Carbon Blacks

The carbon black was prepared in a pilot plant according to one embodiment of a multi-stage reactor depicted in FIG. 1. The reactor dimensions are outlined in Table 1 below.

TABLE 1

| FIG. 1 label | Component |
| --- | --- |
| 10, 11 | XB-102R burner with tab can |
| 14 | 4.5" First Stage Transition w/6 tips |
| 16A | 5.3" Spacer Transition |
| 16B | 5.3" Second Stage Transition w/4 tips |
| 18 | (1) 9" Entry Reactor Section |
| 18 | (2) 13.5" Reactor Sections |
| 18 | (2) 18" Reactor Sections |
| 18 | (2) 27" Reactor Sections |
| 18 | (3) 36" Reactor Sections |

The process conditions for Samples A-H are outlined in Table 2 below.

TABLE 2

| Operating conditions | A | B | C | D | E | F | G | H |
| --- | --- | --- | --- | --- | --- | --- | --- | --- |
| Air rate [Nm$^3$/hr] | 3099 | 3099 | 3099 | 3099 | 3099 | 3099 | 3099 | 3099 |
| Air preheat temp [° C.] | | | | | | | 538 | 538 |
| Overall combustion [%] | 41 | 44 | 41 | 44 | 44 | 44 | 44 | 41 |

TABLE 2-continued

| Operating conditions | A | B | C | D | E | F | G | H |
|---|---|---|---|---|---|---|---|---|
| Primary combustion [%] | 120 | 120 | 120 | 120 | 120 | 120 | 120 | 120 |
| Total feedstock rate [kg/hr] | 496 | 445 | 496 | 445 | 445 | 445 | 445 | 496 |
| FDS temperature [° C.] | | | | | | | 197 | 197 |
| Ring 1 tip quantity | 6 | 6 | 6 | 6 | 6 | 6 | 6 | 6 |
| Ring 1 tip size [inch] | 0.021 | 0.018 | 0.021 | 0.018 | 0.021 | 0.024 | 0.020 | 0.020 |
| Ring 1 pressure [bar] | 45 | 45 | 45 | 53 | 45 | 45 | 54 | 47 |
| Ring 2 tip quantity | 4 | 4 | 4 | 4 | 4 | 4 | 4 | 4 |
| Ring 2 tip size [inch] | 0.021 | 0.018 | 0.021 | 0.018 | 0.014 | 0.014 | 0.014 | 0.020 |
| Ring 2 pressure [bar] | 60 | 60 | 60 | 64 | 60 | 60 | 53 | 48 |
| $K^+$ concentration [ppm] | 0 | 0 | 0 | 0 | 0 | 0 | 5 | 0 |
| Quench location [inch] | 32 | 32 | 32 | 32 | 32 | 32 | 32 | 32 |
| Percent feedstock in first location | 60 | 60 | 60 | 60 | 70 | 80 | 70 | 60 |
| No. of second injection locations | 1 | 1 | 1 | 1 | 1 | 1 | 1 | 1 |

The properties of the raw material carbon blacks prepared under these conditions are outlined in Table 3 below.

TABLE 3

| Carbon Black Sample | BET ($m^2$/g) | STSA ($m^2$/g) | OAN (mL/100 g) | COAN (mL/100 g) | BET-ST ($m^2$/g) | OAN/COAN | STSA/BET |
|---|---|---|---|---|---|---|---|
| A | 210.4 | 172.5 | 177.4 | 133.6 | 38 | 1.33 | 0.82 |
| B | 241.8 | 182.6 | 190.2 | 141.5 | 59 | 1.34 | 0.76 |
| C | 196.8 | 163.5 | 196.5 | 140.6 | 33 | 1.40 | 0.83 |
| D | 248.5 | 188.5 | 178.2 | 130.5 | 60 | 1.37 | 0.76 |
| E | 261.3 | 200.3 | 172.8 | 128.5 | 61 | 1.34 | 0.77 |
| F | 270.6 | 207.1 | 173.7 | 122.0 | 64 | 1.42 | 0.77 |
| G | 257.0 | 194.0 | 178.5 | 128.5 | 63 | 1.39 | 0.75 |
| H | 205.0 | 169.0 | 183.0 | 135.0 | 36 | 1.36 | 0.9 |

The properties of other high structure carbon blacks that can be made from the same apparatus under similar operating conditions are listed in Table 4 below.

TABLE 4

| carbon black | BET ($m^2$/g) | STSA ($m^2$/g) | OAN (mL/100 g) | COAN (mL/100 g) |
|---|---|---|---|---|
| I | 155.4 | 143.2 | 199.3 | 136.7 |
| J | 180.5 | 146.5 | 181.5 | 124.0 |
| K | 162.2 | 151.4 | 181.7 | 132.2 |
| L | 175.0 | 155.5 | 172.7 | 131.6 |

Example 2

Oxidation with Ozone

This Example describes the ozonation of carbon black Samples A-G of Example 1 by using the ozone reactor assembly of FIG. 2 outfitted with a venturi tube.

A carbon black charge from Example 1 (300 g) was combined with water (6 L) and this mixture was homogenized with a rotor-stator at 8,000-10,000 rpm for 3-5 minutes. The resulting slurry was added to the reservoir of the ozone reactor assembly, in which the reservoir pH was maintained at 9.0. The recirculation pump was operated at a rate of 70-90 L/min to circulate the slurry throughout the reactor. Ozone gas (3-5 wt %) was introduced to the slurry via an inlet at the venturi tube at a gas flow rate of 6-10 L/min. Ozonation was performed over a 9 h time period at a reaction temperature of 30-40° C.

Alternatively, a carbon black charge from Example 1 (300-600 g) was combined with water (4-7 L) and this mixture was homogenized with a rotor-stator at 8,000-10,000 rpm for 3-5 minutes. The resulting slurry was added to the reservoir of the ozone reactor assembly, in which the reservoir pH was maintained at 9.0. The recirculation pump was operated at a rate of 70-90 L/min to circulate the slurry throughout the reactor. Ozone gas (2-5 wt %) was introduced to the slurry via an inlet at the venturi tube at a gas flow rate of 6-10 L/min. Ozonation was performed over a 7-9 h time period with the temperature of the reaction being 30-40° C.

Example 3

Modification with 4-aminobenzoic Acid

This Example describes the modification of carbon black samples A-F of Example 1 with 4-aminobenzoic acid (pABA). While this modification was performed on raw material carbon blacks, the same treatment can be performed on the oxidized carbon black samples of Example 2.

A mixture comprising a carbon black charge (500 g) from Example 1, pABA (50-75 g), and water (1-2 L) was added to a Processall reactor. The temperature was raised to 55° C. and sodium nitrite (20%, 150-220 g) was added to this mixture over a time period of 20 min. The reaction was performed for 1-2 h at 65° C.

Example 4

Modification with EBP

This Example describes the modification of carbon black samples A-F of Example 1 with 2-(4-aminophenyl)-1-hydroxyethylidene-1,1-bisphosphonicacid (EBP). A mixture comprising a carbon black charge (500 g) from Example 1, EBP (50-75 g), and water (1-2 L) was added to a Processall reactor. The temperature was raised to 55° C. and sodium nitrite (20%, 150-220 g) was added to this mixture over a time period of 20 min. The reaction was performed for 1-2 h at 65° C.

Example 5

Preparation of Dispersions

This Example describes the preparation of dispersions using the oxidized/treated carbon black materials of Examples 2-4. Diafiltration was performed with a Pall Microza® ultrafiltration membrane (SLP-1053) to a permeate conductivity of less than 150 uS/cm or to a retentate conductivity of less than 1000 uS/cm at 15% dispersion solids. (For samples G-O-S and G-O-U, prior to diafiltration, the resulting dispersions were subjected to a heat treatment where the dispersion is heated to a minimum of 75° C. for 2 h with magnetic or overhead stirring). The sample was then diluted to 5% solids and centrifuged on a Carr® Powerfuge® at 13276 RPM with either a 300 or 600 mL/min flow rate. The sample was reconcentrated to 16% solids with a Pall Microza® ultrafiltration membrane (SLP-1053) and sonicated with a Misonix® Lab probe sonicator inside a vessel with a cooled jacket with magnetic stirring to a D50 target particle size of 140 nm (for comparison, a second set of ozone-oxidized carbon black samples were not subjected to this sonication step). Biocide was added (0.2% (w/w) Proxel®) and the sample was passed through either a 0.3 or 0.5 μm Pall depth filter. The sample was adjusted to 15% solids by adding water.

Properties of the dispersions prepared from the ozone oxidized carbon black samples of Example 2 are listed in Table 5 below. "O" indicates oxidized; "S" indicates sonicated dispersions; "U" indicates unsonicated dispersions; LPC=large particle content.

Example 6

Sedimentation Rates

Sedimentation rates of the dispersions were obtained by the Rough Gravity Sedimentation procedure:

the dispersion was diluted to 3% solids with water;

0.100 mL of the dispersion at 3% solids was diluted to 100 mL in a volumetric flask;

the absorbance of this dilute dispersion was measured at 550 nm using a UV-Vis spectrophotometer ($Abs_1$);

7 mLs of the dispersion at 3% solids was loaded into Beckman super-centrifuge tubes;

the tubes were sealed centrifuged in a Beckman centrifuge at 20700 RPM for 10 minutes (including ramp-up time);

the entire supernatant from the sample tubes was collected into a vial;

0.100 mL of the recovered supernatant was diluted to 100 mL in a volumetric flask; and the absorbance of this dilute dispersion at a wavelength of 550 nm is measured using a UV-Vis spectrophotometer ($Abs_2$).

The sedimentation rate was determined from the $Abs_1$ and $Abs_2$ values according to the following formula:

$$\% \text{ sedimentation} = 100 * ((Abs_1 - Abs_2)/Abs_1)$$

Sedimentation rates for certain dispersions of Example 5 are listed in Table 7 below:

TABLE 5

| Dispersion Sample | Solids (wt %) | pH | mean volume [μm] | D10 [μm] | D50 [μm] | D90 [μm] | D100 [μm] | Viscosity [cPs] | Conductivity [μS/cm] | LPC >1.0 μm (×10⁶) | LPC >0.5 μm (×10⁸) |
|---|---|---|---|---|---|---|---|---|---|---|---|
| A-O-S | 14.59 | 7.65 | 0.1389 | 0.0812 | 0.1273 | 0.2120 | 0.486 | 4.22 | 950 | 1.4 | 2.8 |
| B-O-S | 15.13 | 7.55 | 0.1361 | 0.0814 | 0.1292 | 0.2006 | 0.409 | 3.82 | 1300 | 1.7 | 2.4 |
| C-O-S | 15.13 | 7.34 | 0.1490 | 0.0912 | 0.1377 | 0.2211 | 0.486 | 4.38 | 1050 | 2.5 | 6.9 |
| D-O-S | 15.06 | 7.41 | 0.1400 | 0.0794 | 0.1355 | 0.2060 | 0.409 | 3.98 | 1200 | 0.75 | 6.7 |
| E-O-S | 15.03 | 7.44 | 0.1330 | 0.0874 | 0.1278 | 0.1844 | 0.409 | 5.22 | 1200 | 1.7 | 2.2 |
| F-O-S | 15.09 | 7.43 | 0.1227 | 0.0735 | 0.1129 | 0.1862 | 0.409 | 4.82 | 1250 | 1.1 | 2.2 |
| G-O-S | 15.15 | 9.50 | 0.1391 | 0.0884 | 0.1314 | 0.1992 | 0.409 | 5.78 | 900 | 2.2 | 7.5 |
| A-O-U | 13.85 | 7.05 | 0.1619 | 0.0920 | 0.1548 | 0.2399 | 0.486 | 4.40 | 1400 | 29 | 29 |
| B-O-U | 15.08 | 7.09 | 0.1482 | 0.0989 | 0.1418 | 0.2048 | 0.409 | 4.92 | 1700 | 15 | 20 |
| C-O-U | 15.03 | 7.06 | 0.1633 | 0.1037 | 0.1556 | 0.2315 | 0.486 | 5.46 | 1200 | 13 | 28 |
| D-O-U | 14.97 | 7.09 | 0.1591 | 0.0857 | 0.1479 | 0.2489 | 0.486 | 5.28 | 1560 | 34 | 35 |
| E-O-U | 14.96 | 7.10 | 0.1511 | 0.0928 | 0.1456 | 0.2159 | 0.409 | 6.18 | 1600 | 15 | 14E |
| G-O-U | 15.15 | 9.43 | 0.1669 | 0.0953 | 0.1515 | 0.2618 | 0.578 | 12.80 | 800 | 1.3 | 30 |

Properties of the dispersions prepared with the pABA-treated carbon black of Example 3 are listed in Table 6 below.

TABLE 6

| Dispersion Sample | solids (wt %) | pH | mean volume (μm) | D10 (μm) | D50 (μm) | D90 (μm) | D100 (μm) | LPC >1 μm (×10⁶) | LPC >0.5 μm (×10⁸) | Viscosity (cPs) | Cond. (μS/cm) |
|---|---|---|---|---|---|---|---|---|---|---|---|
| A-pABA | 15.22 | 9.05 | 0.1328 | 0.0844 | 0.1249 | 0.1903 | 0.409 | 1.2 | 7.0 | 4.90 | 900 |
| B-pABA | 15.17 | 8.52 | 0.139 | 0.0793 | 0.133 | 0.207 | 0.409 | 0.77 | 4.8 | 4.50 | 900 |
| C-pABA | 15.10 | 8.74 | 0.135 | 0.0862 | 0.1278 | 0.1919 | 0.409 | 0.66 | 4.9 | 4.18 | 825 |
| D-pABA | 15.06 | 9.17 | 0.1339 | 0.0784 | 0.1289 | 0.1951 | 0.409 | 3.6 | 7.4 | 4.12 | 1000 |
| E-pABA | 15.06 | 9.13 | 0.1322 | 0.077 | 0.1243 | 0.1969 | 0.409 | 1.2 | 5.2 | 6.44 | 925 |
| F-pABA | 14.99 | 8.72 | 0.1369 | 0.0868 | 0.133 | 0.1906 | 0.409 | 4.0 | 5.8 | 6.56 | 1125 |

TABLE 7

| Carbon Black Sample | Sedimentation Rate (%) |
| --- | --- |
| A-O-S | 70.2 |
| B-O-S | 75.2 |
| C-O-S | 79.7 |
| D-O-S | 66.9 |
| E-O-S | 61.8 |
| F-O-S | 53.5 |
| A-pABA | 68.4 |
| B-pABA | 74.9 |
| C-pABA | 79.6 |
| D-pABA | 70.2 |
| E-pABA | 59.0 |
| F-pABA | 56.4 |

Example 7

Inkjet Ink Formulations

Inkjet ink formulations were prepared from the dispersions of Example 5, with components in proportions (in pph) as listed in Tables 8 and 9 below.

TABLE 8

| Formulation A | Percent component (w/w) |
| --- | --- |
| Pigment | 4.0 |
| Surfynol 465 | 1.0 |
| Triethyleneglycol monobutylether | 5.0 |
| Glycerin | 10.0 |
| Water | 80.0 |

TABLE 9

| Formulation B | Percent component (w/w) |
| --- | --- |
| Pigment | 4.0 |
| Surfynol 465 | 1.0 |
| Trimethylol propane | 7.0 |
| Glycerin | 7.0 |
| Diethylene glycol | 5.0 |
| Water | 76.0 |

Example 8

Optical Density

Inkjet Formulations A and B of Example 7 were printed on Xerox 4200 and HPMP paper. An Epson C88+ inkjet printer was used to print Formulation A and a Canon iP4000 inkjet printer was used to print Formulation B. The printing was performed on Best and Normal modes, as listed in Table 10 below along with the resulting optical density values. "A" indicates Formulation A; "B" indicates Formulation B.

TABLE 10

| Dispersion | A Best X4200 | A Norm X4200 | A Best HPMP | A Norm HPMP | A Average OD | B Best X4200 | B Norm X4200 | B Best HPMP | B Norm HPMP | B Average OD | Total average OD |
| --- | --- | --- | --- | --- | --- | --- | --- | --- | --- | --- | --- |
| A-O-S | 1.40 | 1.23 | 1.50 | 1.40 | 1.38 | 1.28 | 1.12 | 1.52 | 1.58 | 1.37 | 1.38 |
| B-O-S | 1.39 | 1.22 | 1.50 | 1.39 | 1.38 | 1.23 | 1.09 | 1.50 | 1.52 | 1.33 | 1.36 |
| C-O-S | 1.43 | 1.26 | 1.54 | 1.41 | 1.41 | 1.31 | 1.12 | 1.52 | 1.53 | 1.37 | 1.39 |
| D-O-S | 1.40 | 1.24 | 1.52 | 1.39 | 1.38 | 1.27 | 1.11 | 1.48 | 1.48 | 1.33 | 1.36 |
| E-O-S | 1.45 | 1.22 | 1.53 | 1.39 | 1.40 | 1.31 | 1.11 | 1.49 | 1.53 | 1.36 | 1.38 |
| F-O-S | 1.39 | 1.22 | 1.47 | 1.38 | 1.36 | 1.26 | 1.10 | 1.46 | 1.49 | 1.33 | 1.34 |
| G-O-S | 1.30 | 1.23 | 1.39 | 1.38 | 1.32 | 1.35 | 1.11 | 1.54 | 1.45 | 1.36 | 1.34 |
| A-O-U | 1.48 | 1.27 | 1.59 | 1.43 | 1.44 | 1.36 | 1.14 | 1.54 | 1.58 | 1.40 | 1.42 |
| B-O-U | 1.49 | 1.29 | 1.60 | 1.45 | 1.46 | 1.32 | 1.14 | 1.55 | 1.56 | 1.39 | 1.42 |
| C-O-U | 1.50 | 1.28 | 1.60 | 1.47 | 1.46 | 1.36 | 1.14 | 1.57 | 1.61 | 1.42 | 1.44 |
| D-O-U | 1.44 | 1.23 | 1.54 | 1.40 | 1.40 | 1.29 | 1.14 | 1.48 | 1.49 | 1.35 | 1.37 |
| E-O-U | 1.46 | 1.28 | 1.57 | 1.41 | 1.43 | 1.33 | 1.12 | 1.51 | 1.52 | 1.37 | 1.40 |
| F-O-U | 1.43 | 1.23 | 1.54 | 1.40 | 1.40 | 1.30 | 1.12 | 1.49 | 1.48 | 1.35 | 1.37 |
| G-O-U | 1.47 | 1.29 | 1.58 | 1.40 | 1.43 | 1.41 | 1.15 | 1.60 | 1.53 | 1.42 | 1.43 |
| A-pABA | 1.17 | 1.09 | 1.35 | 1.22 | 1.21 | 1.13 | 1.05 | 1.39 | 1.43 | 1.25 | 1.23 |
| B-pABA | 1.15 | 1.08 | 1.32 | 1.20 | 1.19 | 1.12 | 1.04 | 1.34 | 1.27 | 1.19 | 1.19 |
| C-pABA | 1.13 | 1.05 | 1.35 | 1.20 | 1.18 | 1.12 | 1.04 | 1.38 | 1.28 | 1.21 | 1.19 |
| D-pABA | 1.18 | 1.09 | 1.36 | 1.22 | 1.21 | 1.11 | 1.02 | 1.34 | 1.32 | 1.20 | 1.20 |
| E-pABA | 1.20 | 1.10 | 1.40 | 1.26 | 1.24 | 1.13 | 1.05 | 1.35 | 1.31 | 1.21 | 1.22 |
| F-pABA | 1.18 | 1.09 | 1.35 | 1.21 | 1.21 | 1.12 | 1.03 | 1.35 | 1.31 | 1.20 | 1.20 |

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A dispersion comprising a carbon black having the following properties:
   OAN ≥170 mL/100 g;
   STSA ranging from 160 to 220 $m^2/g$;
   BET surface area ranging from 190 to 275 $m^2/g$; and
   a COAN of at least 120 mL/100 g.

2. The dispersion of claim 1, wherein the carbon black is an oxidized carbon black.

3. The dispersion of claim 2, wherein the oxidized carbon black has a surface comprising at least one group selected from phenols, lactones, carbonyls, carboxyls, anhydrides, ethers, and quinones.

4. The dispersion of claim 2, wherein the carbon black is a modified carbon black.

5. The dispersion of claim 4, wherein the carbon black is modified with at least one organic group.

6. The dispersion of claim 5, wherein the at least one organic group comprises the formula —[R(A)]-, wherein:
   R is attached to the carbon black and is selected from arylene, heteroarylene, and alkylene, and
   A is selected from carboxylic acids, sulfonic acids, phosphonic acids, hydroxyls, amines, and esters, amides, and salts thereof.

7. The carbon black of claim 6, wherein R comprises the formula R'-Sp, wherein R' is selected from arylene, heteroarylene, and alkylene, and Sp is a spacer selected from —$CO_2$—, —$O_2C$—, —CO—, —$OSO_2$—, —$SO_3$—, —$SO_2$—, —$SO_2C_2H_4$—O—, —$SO_2C_2H_4S$—, —$SO_2C_2H_4NR''$—, —O—, —S—, —NR''—, —NR''CO—, —CONR''—, —$NR''CO_2$—, —$O_2CNR''$—, —NR''CONR''—, —N(COR'')CO—, —CON(COR'')—, —NR''COCH($CH_2CO_2R''$)— and cyclic imides therefrom, —NR''$COCH_2$CH($CO_2R''$)— and cyclic imides therefrom, —CH($CH_2CO_2R''$)CONR''— and cyclic imides therefrom, —CH($CO_2R''$)$CH_2$CONR'' and cyclic imides therefrom, sulfonamide groups, arylene groups, alkylene groups, and R'', which can be the same or different, is selected from hydrogen, substituted and unsubstituted $C_5$-$C_{20}$ aryl groups, and substituted and unsubstituted $C_1$-$C_6$ alkyl groups.

8. The carbon black of claim 6, wherein R comprises the formula R'-Sp, wherein R' is selected from arylene, heteroarylene, and alkylene, and Sp is a spacer derived from a compound having a reactive group selected from a carboxylic acid or ester, an acid chloride, a sulfonyl chloride, an acyl azide, an isocyanate, a ketone, an aldehyde, an anhydride, an amide, an imide, an imine, an α,β-unsaturated ketone, aldehyde, or sulfone, an alkyl halide, an epoxide, an alkyl sulfonate or sulfate such as a (2-sulfatoethyl)-sulfone group, an amine, a hydrazine, an alcohol, a thiol, a hydrazide, an oxime, a triazene, a carbanion, an aromatic compound, and salts and derivatives thereof, or any combination thereof.

9. The carbon black of claim 6, wherein R comprises the formula R'-Sp, wherein R' is selected from arylene, heteroarylene, and alkylene, and Sp is a spacer derived from a compound selected from 4-aminobenzyl amine, 3-aminobenzyl amine, 2-aminobenzyl amine, 2-aminophenyl ethylamine, 4-aminophenyl-(2-sulfatoethyl)-sulphone, p-aminobenzoic acid, 4-aminophthalic acid, and 5-aminobenzene-1,2,3-tricarboxylic acid.

10. The dispersion of claim 1, wherein the carbon black has a mean volume ranging from 0.1 to 0.18 μm.

11. The dispersion of claim 1, wherein the carbon black has a D10 ranging from 0.05 to 0.1 μm.

12. The dispersion of claim 1, wherein the carbon black has a D10 ranging from 0.06 to 0.1 μm.

13. The dispersion of claim 1, wherein the carbon black has a D10 ranging from 0.07 to 0.1 μm.

14. The dispersion of claim 1, wherein the carbon black has a D50 ranging from 0.1 to 0.16 μm.

15. The dispersion of claim 1, wherein the carbon black has a D90 ranging from 0.18 to 0.25 μm.

16. The dispersion of claim 1, wherein the carbon black has a D90 ranging from 0.15 to 0.24 μm.

17. The dispersion of claim 1, wherein the carbon black has a D90 ranging from 0.18 to 0.24 μm.

18. The dispersion of claim 1, wherein the dispersion is aqueous.

19. An inkjet ink composition comprising the dispersion of claim 1.

20. The dispersion of claim 5, wherein the at least one organic group comprises at least one ionic group, ionizable group, or mixtures of an ionic group and an ionizable group.

21. The dispersion of claim 20, wherein the at least one ionic group comprises at least one anionic group selected from —$COO^-$, —$SO_3^-$, —$OSO_3^-$, —$HPO_3^-$, —$OPO_3^{2-}$, and —$PO_3^{2-}$.

22. The dispersion of claim 20, wherein the at least one ionizable group is selected from —COOH, —$SO_3H$, —$PO_3H_2$, —R'SH, or R'OH, where R' represents hydrogen or a substituted or unsubstituted aryl or alkyl group.

23. The dispersion of claim 5, wherein the at least one organic group is attached to the carbon black either directly or indirectly via an intermediary or spacer group.

24. The dispersion of claim 5, wherein the at least one organic group is selected from a benzene carboxylic acid group, a benzene dicarboxylic acid group, and a benzene tricarboxylic acid group.

25. The dispersion of claim 6, wherein A is selected from carboxylic acids, sulfonic acids, phosphonic acids, hydroxyls, amines, and esters, amides, and salts thereof.

26. The dispersion of claim 6, wherein A is selected from hydrogen, alkyls, aryls, heteroaryls, alkylene oxides (e.g., ethylene or propylene oxide), carboxylic acid esters, and glycols.

27. An inkjet ink composition comprising a carbon black having the following properties:
   OAN ≥170 mL/100 g;
   STSA ranging from 160 to 220 $m^2/g$;
   BET surface area ranging from 190 to 275 $m^2/g$; and
   a COAN of at least 120 mL/100 g.

28. The inkjet ink composition of claim 27, wherein the composition further comprises at least one surfactant.

29. The inkjet ink composition of claim 28, wherein the at least one surfactant comprises at least one anionic surfactant.

30. The inkjet ink composition of claim 29, wherein the at least one anionic surfactant is selected from higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates, formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, and hydroxylated and aminated derivatives.

31. The inkjet ink composition of claim 28, wherein the at least one surfactant comprises at least one nonionic surfactant.

32. The inkjet ink composition of claim 31, wherein the at least one nonionic surfactant is selected from fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides.

33. The inkjet ink composition of claim 27, wherein the composition further comprises at least one dispersant.

34. The inkjet ink composition of claim 27, wherein the composition further comprises at least one polymeric dispersant.

35. The inkjet ink composition of claim 34, wherein the at least one dispersant is selected from polyvinyl alcohols, polyvinylpyrrolidones, poly(meth)acrylic acid, acrylic acid-(meth)acrylonitrile copolymers, potassium (meth)acrylate-(meth)acrylonitrile copolymers, vinyl acetate-(meth)acrylate ester copolymers and (meth)acrylic acid-(meth)acrylate ester copolymers; styrene-(meth)acrylic acid copolymers, styrene-(meth)acrylic acid-(meth)acrylate ester copolymers, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

36. The inkjet ink composition of claim 27, wherein the composition further comprises at least one polymeric binder.

37. The inkjet ink composition of claim 27, wherein the composition further comprises at least one cosolvent that is soluble or miscible in water at concentrations of at least 10% by weight.

38. The inkjet ink composition of claim 27, wherein the carbon black is modified with at least one attached organic group.

39. The inkjet ink composition of claim 38, wherein the at least one organic group comprises at least one ionic group, ionizable group, or mixtures of an ionic group and an ionizable group.

40. The inkjet ink composition of claim 39, wherein the at least one ionic group comprises at least one anionic group selected from —COO$^-$, —SO$_3^-$, —OSO$_3^-$, —HPO$_3^-$, —OPO$_3^{2-}$, and —PO$_3^{2-}$.

41. The inkjet ink composition of claim 39, wherein the at least one ionic group comprises —COO$^-$.

42. The inkjet ink composition of claim 39, wherein the at least one ionizable group is selected from —COOH, —SO$_3$H, —PO$_3$H$_2$, —R'SH, or —R'OH.

43. The inkjet ink composition of claim 39, wherein the at least one ionizable group comprises —COOH.

44. The inkjet ink composition of claim 38, wherein the at least one organic group is attached to the carbon black either directly or indirectly via an intermediary or spacer group.

45. The inkjet ink composition of claim 38, wherein the at least one organic group is selected from a benzene carboxylic acid group, a benzene dicarboxylic acid group, and a benzene tricarboxylic acid group.

\* \* \* \* \*